United States Patent
Gopal Reddy

(10) Patent No.: US 12,266,029 B2
(45) Date of Patent: Apr. 1, 2025

(54) REDUCING CARBON EMISSIONS OF A VEHICLE IN A PARKING GARAGE

(71) Applicant: T-Mobile USA, Inc., Bellevue, WA (US)

(72) Inventor: Sunil Kumar Gopal Reddy, Olathe, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/362,767

(22) Filed: Jul. 31, 2023

(65) Prior Publication Data
US 2025/0045858 A1 Feb. 6, 2025

(51) Int. Cl.
*G06Q 50/40* (2024.01)
*H04W 4/021* (2018.01)
*H04W 12/06* (2021.01)

(52) U.S. Cl.
CPC ............ *G06Q 50/40* (2024.01); *H04W 4/021* (2013.01); *H04W 12/068* (2021.01); *G06Q 2240/00* (2013.01)

(58) Field of Classification Search
CPC .... G06Q 50/30; G06Q 2240/00; G06Q 50/40; G06Q 50/43; G06Q 50/47; H04W 12/068; H04W 4/021
See application file for complete search history.

(56) References Cited

U.S. PATENT DOCUMENTS

| 7,114,651 | B2 | 10/2006 | Hjelmvik |
| 7,950,570 | B2 | 5/2011 | Marchasin et al. |
| 9,111,145 | B2 | 8/2015 | Carbonell et al. |
| 9,119,076 | B1* | 8/2015 | Gubbi ................. H04L 63/0853 |
| 9,323,993 | B2 | 4/2016 | Wang et al. |
| 9,567,007 | B2 | 2/2017 | Cudak et al. |

(Continued)

FOREIGN PATENT DOCUMENTS

| CN | 101790744 A | 7/2010 |
| CN | 101454807 B | 11/2011 |

(Continued)

OTHER PUBLICATIONS

C. Huang, R. Lu, X. Lin and X. Shen, "Secure Automated Valet Parking: A Privacy-Preserving Reservation Scheme for Autonomous Vehicles," Nov. 2018, in IEEE Transactions on Vehicular Technology, vol. 67, No. 11, pp. 11169-11180 (Year: 2018).*

*Primary Examiner* — Jeff Zimmerman
*Assistant Examiner* — Wayne S. Murray
(74) *Attorney, Agent, or Firm* — Perkins Coie LLP

(57) ABSTRACT

The system obtains a unique identifier of the vehicle and a unique identifier of a driver of the vehicle. The system generates an OTP using the unique identifier of the vehicle and the unique identifier of the driver of the vehicle and sends the OTP to the UE of the driver of the vehicle. The system authenticates the vehicle and the driver of the vehicle by receiving the OTP from the unique identifier of the UE. The system creates in a database an association between the unique identifier of the vehicle, the unique identifier of the driver of the vehicle, and the UE of the driver of the vehicle. The system detects that the UE is proximate to the parking garage where the vehicle is parked. Upon detecting that the UE is proximate to the parking garage, the system identifies the vehicle of the UE and delivers the vehicle.

19 Claims, 5 Drawing Sheets

(56) References Cited

U.S. PATENT DOCUMENTS

| | | |
|---|---|---|
| 9,568,335 B2 | 2/2017 | Thakur et al. |
| 9,601,018 B2 | 3/2017 | Cogill et al. |
| 9,944,282 B1 | 4/2018 | Fields et al. |
| 10,152,888 B1 | 12/2018 | Knas et al. |
| 10,249,184 B2 | 4/2019 | Demisse et al. |
| 10,431,098 B1 | 10/2019 | Price et al. |
| 10,818,179 B1 | 10/2020 | Knas et al. |
| 10,902,485 B2 | 1/2021 | Sen |
| 11,024,104 B2 | 6/2021 | Gaddam et al. |
| 11,222,370 B2 | 1/2022 | Sen |
| 11,355,016 B2 | 6/2022 | Price et al. |
| 11,417,152 B2 | 8/2022 | Qian et al. |
| 11,565,597 B2 | 1/2023 | Spiro |
| 2010/0191584 A1 | 7/2010 | Fraser et al. |
| 2012/0007983 A1 | 1/2012 | Welch |
| 2012/0111937 A1* | 5/2012 | Rogich ............... G06Q 50/12 235/380 |
| 2013/0046587 A1 | 2/2013 | Fraser et al. |
| 2013/0173358 A1 | 7/2013 | Pinkus |
| 2016/0133133 A1* | 5/2016 | Triplett ............... H04W 4/023 340/932.2 |
| 2017/0186317 A1 | 6/2017 | Franklin et al. |
| 2019/0096241 A1* | 3/2019 | Gao ..................... G08G 1/04 |
| 2019/0243368 A1* | 8/2019 | Seki ............ B60W 60/00253 |
| 2019/0303929 A1* | 10/2019 | Brown ............... H04L 63/0853 |
| 2020/0134963 A1 | 4/2020 | Odinak et al. |
| 2020/0150657 A1* | 5/2020 | Yoo ..................... B60W 30/06 |
| 2020/0394425 A1 | 12/2020 | Misra et al. |
| 2022/0301438 A1 | 9/2022 | Price et al. |
| 2023/0016466 A1* | 1/2023 | Berggren ............... H02J 50/60 |

FOREIGN PATENT DOCUMENTS

| | | |
|---|---|---|
| CN | 104574250 A | 4/2015 |
| CN | 108090975 A | 5/2018 |
| CN | 108280939 A | 7/2018 |
| CN | 108510791 A | 9/2018 |
| CN | 108597041 A | 9/2018 |
| CN | 107665585 B | 11/2020 |
| CN | 112184927 A | 1/2021 |
| CN | 112348981 A | 2/2021 |
| CN | 112908019 A | 6/2021 |
| CN | 113140049 A | 7/2021 |
| CN | 112185158 B | 4/2022 |
| CN | 112907761 B | 11/2022 |
| CN | 111899550 B | 12/2022 |
| CN | 113284279 B | 1/2023 |
| DE | 102007035170 A1 | 1/2009 |
| DE | 202016008688 U1 | 1/2019 |
| DE | 112017006710 T5 | 9/2019 |
| DE | 102013221631 B4 | 1/2022 |
| EP | 1163129 A1 | 12/2001 |
| EP | 1227445 A1 | 7/2002 |
| EP | 2118868 A1 | 11/2009 |
| EP | 2183718 A1 | 5/2010 |
| EP | 2273462 A1 | 1/2011 |
| EP | 2335197 A1 | 6/2011 |
| EP | 2380143 A1 | 10/2011 |
| EP | 2275995 B1 | 11/2011 |
| EP | 2473947 A1 | 7/2012 |
| EP | 2559590 A2 | 2/2013 |
| EP | 2657914 A2 | 10/2013 |
| EP | 2721595 A2 | 4/2014 |
| EP | 2845172 A1 | 3/2015 |
| EP | 3174028 A1 | 5/2017 |
| EP | 3188149 A1 | 7/2017 |
| EP | 3292543 A1 | 3/2018 |
| EP | 3751480 A1 | 12/2020 |
| JP | 2008070989 A | 3/2008 |
| JP | 4352767 B2 | 10/2009 |
| JP | 2010533909 A | 10/2010 |
| JP | 2013175223 A | 9/2013 |
| JP | 2015179531 A | 10/2015 |
| JP | 6001325 B2 | 9/2016 |
| JP | 6016676 B2 | 10/2016 |
| JP | 2019021273 A | 2/2019 |
| JP | 6530562 B2 | 5/2019 |
| KR | 101260042 B1 | 4/2013 |
| KR | 101556947 B1 | 10/2015 |
| KR | 20180061569 A | 6/2018 |
| KR | 20190014162 A | 2/2019 |
| KR | 102108833 B1 | 5/2020 |
| WO | 0046068 A1 | 8/2000 |
| WO | 03025865 A1 | 3/2003 |
| WO | 2009009854 A1 | 1/2009 |
| WO | 2010071942 A1 | 7/2010 |
| WO | 2014059450 A1 | 4/2014 |
| WO | 2014130194 A1 | 8/2014 |
| WO | 2015011116 A1 | 1/2015 |
| WO | 2015073726 A1 | 5/2015 |
| WO | 2015118386 A1 | 8/2015 |
| WO | 2016142940 A1 | 9/2016 |
| WO | 2016159485 A1 | 10/2016 |
| WO | 2017033066 A1 | 3/2017 |
| WO | 2017035423 A1 | 3/2017 |
| WO | 2018182067 A1 | 10/2018 |
| WO | 2019174167 A1 | 9/2019 |
| WO | 2021109307 A1 | 6/2021 |

* cited by examiner

REDUCING CARBON EMISSIONS OF A VEHICLE IN A PARKING GARAGE

BACKGROUND

In large parking lots, a driver has to drop off the vehicle by themselves and remember the parking location of the vehicle for later pickup. Alternatively, the driver hands over the vehicle to a valet and gets some form of physical acknowledgment identifying the driver's car. When trying to pick up the vehicle, the driver has to come and wait for the vehicle to be brought out. The vehicle can be brought out and can idle until the driver pays for parking and picks up the vehicle. While idling, the vehicle unnecessarily emits greenhouse gases.

BRIEF DESCRIPTION OF THE DRAWINGS

Detailed descriptions of implementations of the present invention will be described and explained through the use of the accompanying drawings.

Figure 1:
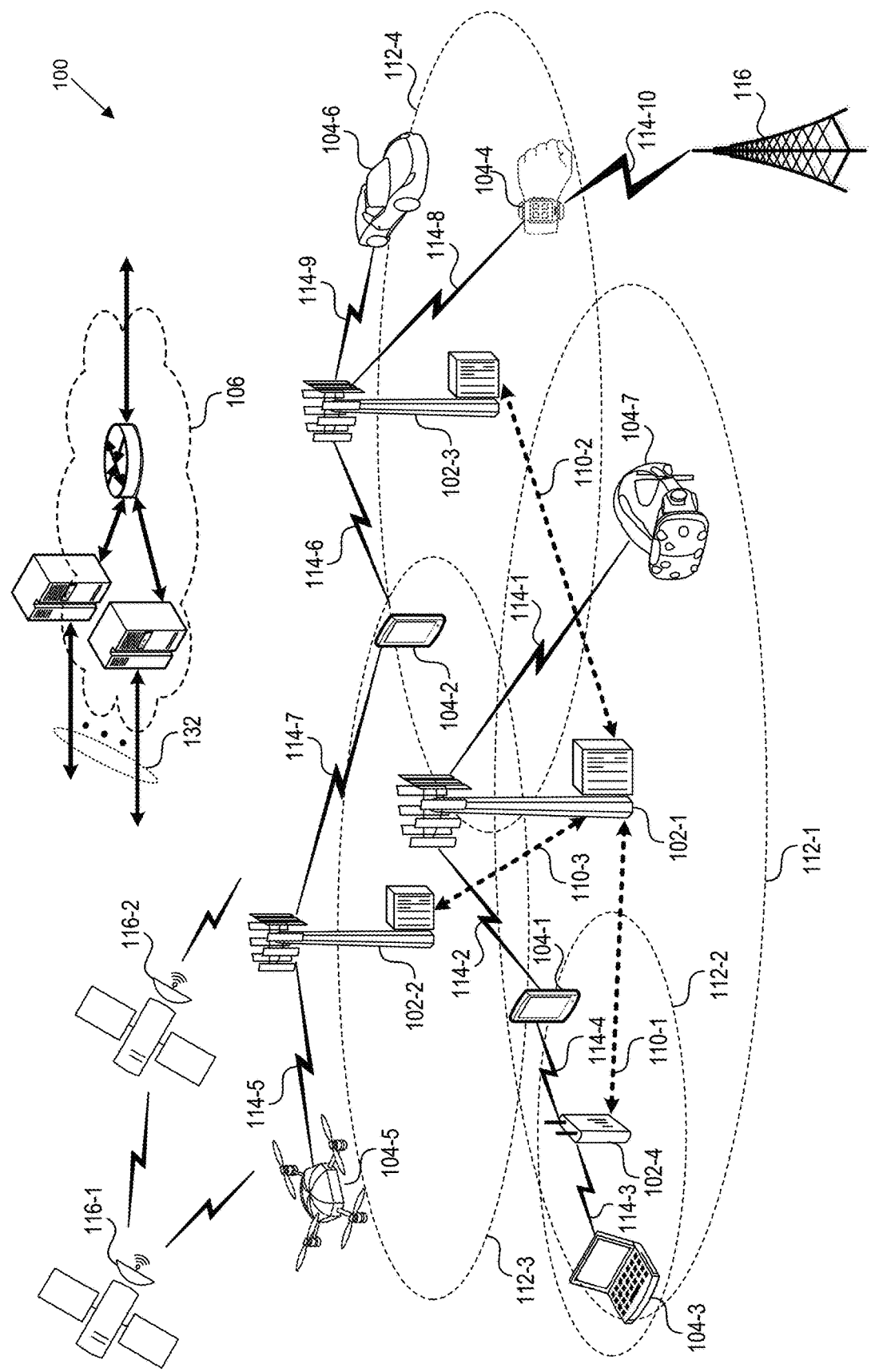
FIG. 1 is a block diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed system and method reduce carbon emissions associated with a vehicle in a parking garage by delivering a vehicle, e.g., a car, to the driver when needed and reducing idling time of the vehicle waiting for the driver. The system obtains a unique identifier associated with the vehicle, such as a combination of the vehicle's license plate and a vehicle identification number (VIN). The system obtains a unique identifier associated with a driver of the vehicle, where the unique identifier is a combination of a mobile number associated with a mobile device operating on a wireless telecommunication network and a driver's license associated with the driver of the vehicle.

The system generates a one-time password associated with the unique identifier associated with the vehicle and the unique identifier associated with the driver of the vehicle. The system sends the one-time password to the mobile device associated with the driver of the vehicle. The system authenticates the vehicle and the driver of the vehicle by receiving the one-time password from the mobile number associated with the mobile device. The system creates in a database an association between the unique identifier associated with the vehicle, the unique identifier associated with the driver of the vehicle, and the mobile device associated with the driver of the vehicle.

The system causes the vehicle to be parked in the parking garage. The system detects that the mobile device is proximate to the parking garage a predetermined amount of time after the driver enters the garage. The predetermined amount of time can be more than 5 minutes. That way, the system avoids detecting the driver exiting the garage. Upon detecting that the driver is proximate to the garage, the system asks for confirmation that the driver wants to pick up the car. If the driver is in the lounge, even without the confirmation, the system concludes that the driver wants to pick up the car.

Upon detecting that the mobile device is proximate to the parking garage, the system identifies the vehicle associated with the mobile device. Upon identifying the vehicle associated with the mobile device, the system delivers the vehicle to the driver.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

Reducing Carbon Emissions of a Vehicle in a Parking Garage

Figure 2:
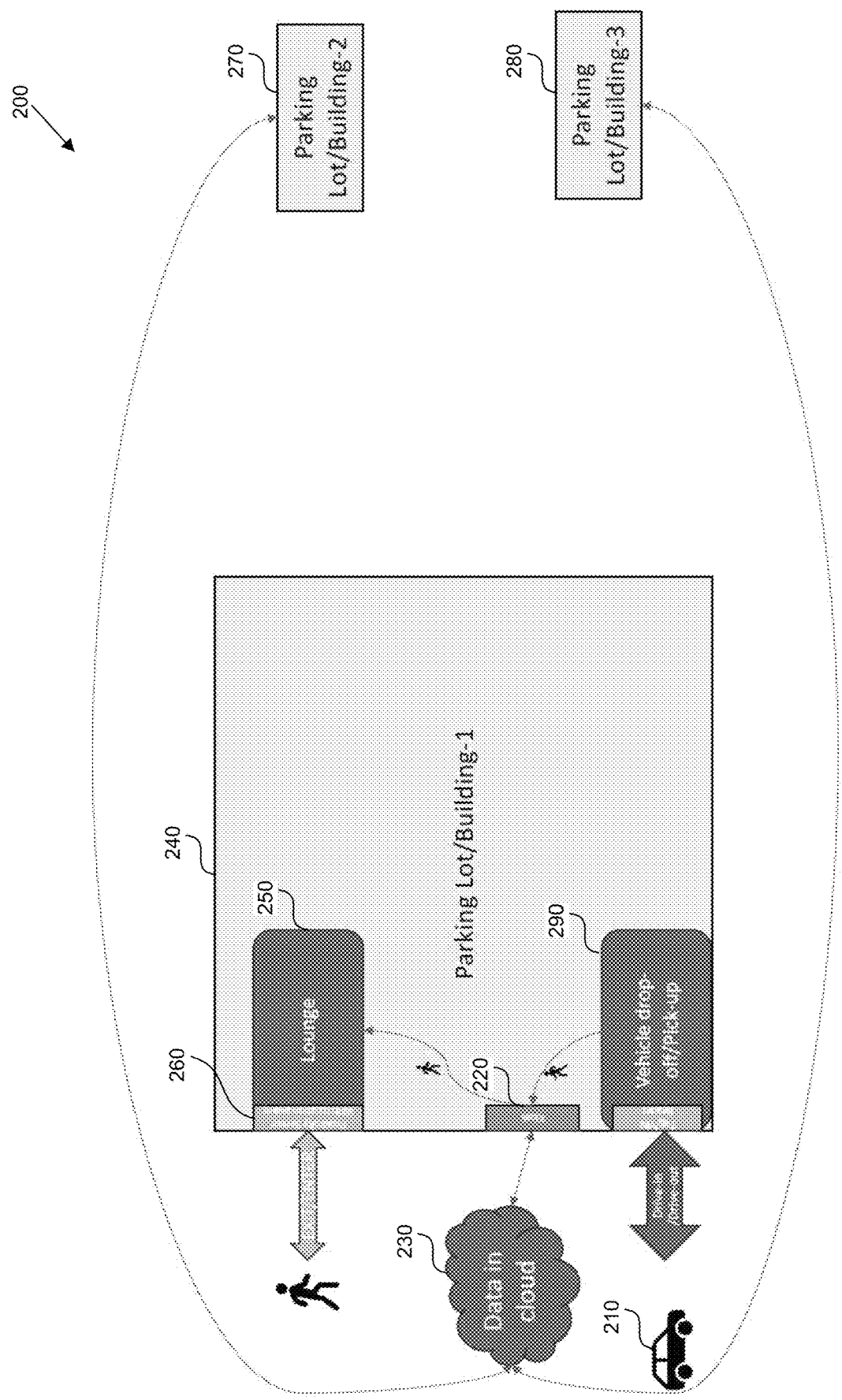
FIG. 2 shows a system for reducing carbon emissions of a vehicle in a parking garage.

FIG. 2 shows a system for reducing carbon emissions of a vehicle in a parking garage 240. The system 200 can read the license plate and VIN of the vehicle 210. The kiosk 220 can display the license plate and the VIN and ask the user, e.g., driver, for verification. When the driver verifies the license plate and the VIN, the system 200 can create a unique identifier associated with the vehicle by combining the license plate and the VIN. For example, to combine, the system 200 can concatenate the license plate and the VIN. In addition, the system can hash the unique ID for security purposes to prevent third parties from accessing the vehicle 210 information.

The system 200 can also create a unique identifier associated with the driver. To create the unique identifier, the system 200 can ask the driver for the mobile number of the driver's cell phone. In addition, the system 200 can obtain the driver's license. For example, if the driver's license is stored in a digital wallet, the system 200 can read the driver's license in the digital wallet. If the driver's license is a physical card, the system 200 can scan the physical card. Alternative to the driver's license, or in addition to the driver's license, the system 200 can perform a biometric scan of the user, such as a fingerprint, cornea, and/or face. The system 200 can combine the mobile number with the driver's license and/or the biometric scan to obtain the unique ID associated with the driver.

The system 200 can query the driver to confirm the driver's license information. Once the driver confirms the driver's license information, the system 200 can generate a one-time password (OTP), which the system can send to the mobile device via a message such as a text message. The OTP can be a six-digit alphanumeric code the system 200 can use to authenticate the driver. The system 200 can ask the driver to verify the mobile device received the OTP. Once the driver verifies the OTP, the system 200 can generate and store in a database 230 a unique identifier that ties together the unique identifier associated with the driver, the unique identifier associated with the vehicle, and the mobile number associated with the driver. The system 200 can send the unique identifier to the mobile device of the driver, thus enabling the driver to communicate with the system and refer to the vehicle 210 using the unique identifier. After verifying the needed information, the driver can exit the parking garage 240 through the lounge area 250. The information stored in the database 230 can be encrypted to prevent third parties from unauthorized access. The decryption of information stored in the database 230 can occur at the parking garage 240.

When the driver is ready to pick up the vehicle, the driver can enter through the lounge area 250. A proximity sensor 260 in the lounge area 250 can detect the driver's mobile phone within a 40-meter radius. The system 200 can automatically send a request to the mobile device of the driver to verify whether the vehicle 210 should be delivered to the driver. Upon receiving the verification from the driver that the vehicle 210 should be delivered, the system 200 can initiate the delivery of the vehicle. The driver can also reply with the unique identifier stored in the database 230, thus indicating which vehicle 210 to deliver to the driver. If the driver does not reply requesting the delivery of the vehicle 210, the system 200 can monitor the location of the mobile device associated with the driver. If the system 200 detects the mobile device in the lounge area 250, the system 200 can request delivery of the vehicle 210 even without receiving the reply from the driver. To determine which vehicle to deliver, the system 200 can retrieve the unique ID associated with the mobile device that is detected in the lounge area 250.

The system 200 can use the information stored in the database 230. The database 230 can be available to the parking garage 240, as well as other parking garages 270, 280 that have access to the database 230. When the vehicle 210 arrives at a parking garage 240, 270, 280, the system 200 can detect the VIN and the license plate. Based on the VIN and the license plate, the system 200 can retrieve the mobile number stored in the database 230 and associated with the VIN and the license plate. The system 200 can send a code to the mobile device stored in the database 230 and associated with the VIN and the license plate. The driver can send back the code to the system 200 to acknowledge receiving the code, in which case the system 200 does not require any additional information from the driver, such as driver's license or biometric scanning.

If the driver has a new phone number, or if a different driver is driving the vehicle 210, the system 200 can enable the driver to enter a new mobile number, a new license, and/or biometrics. The system 200 can create a new unique identifier associating the already existing VIN and license plate and the new mobile number.

The parking garage 240 can include sensors in each parking spot to determine whether the parking spot is occupied or available. Based on the available parking spots, the system 200 can assign a particular parking spot to the vehicle 210. The system 200 can store the parking spot of the vehicle 210 in the database 230. Once the driver wants the car delivered, the system 200 can retrieve the parking spot of the vehicle 210 and can notify the parking garage 240 operator where to retrieve the vehicle 210. Alternatively, if the vehicle 210 is a self-driving vehicle, the system 200 can signal to the vehicle 210 to drive to the vehicle drop-off/pickup area 290.

In addition, the parking garage 240 can include solar panels used to power the system 200, as well as the parked vehicle 210. If the parked vehicle 210 is an electric vehicle capable of wireless charging, the parking garage 240 can provide solar wireless charging to the parked vehicle 210.

The system 200 provides several benefits, including reducing vehicle 210 idle times waiting for the driver, thus reducing carbon emissions. Further, the system 200 reduces the wait time for the driver by detecting the driver approaching the parking garage 240 and delivering the vehicle prior to the driver requesting it.

Figure 3A:
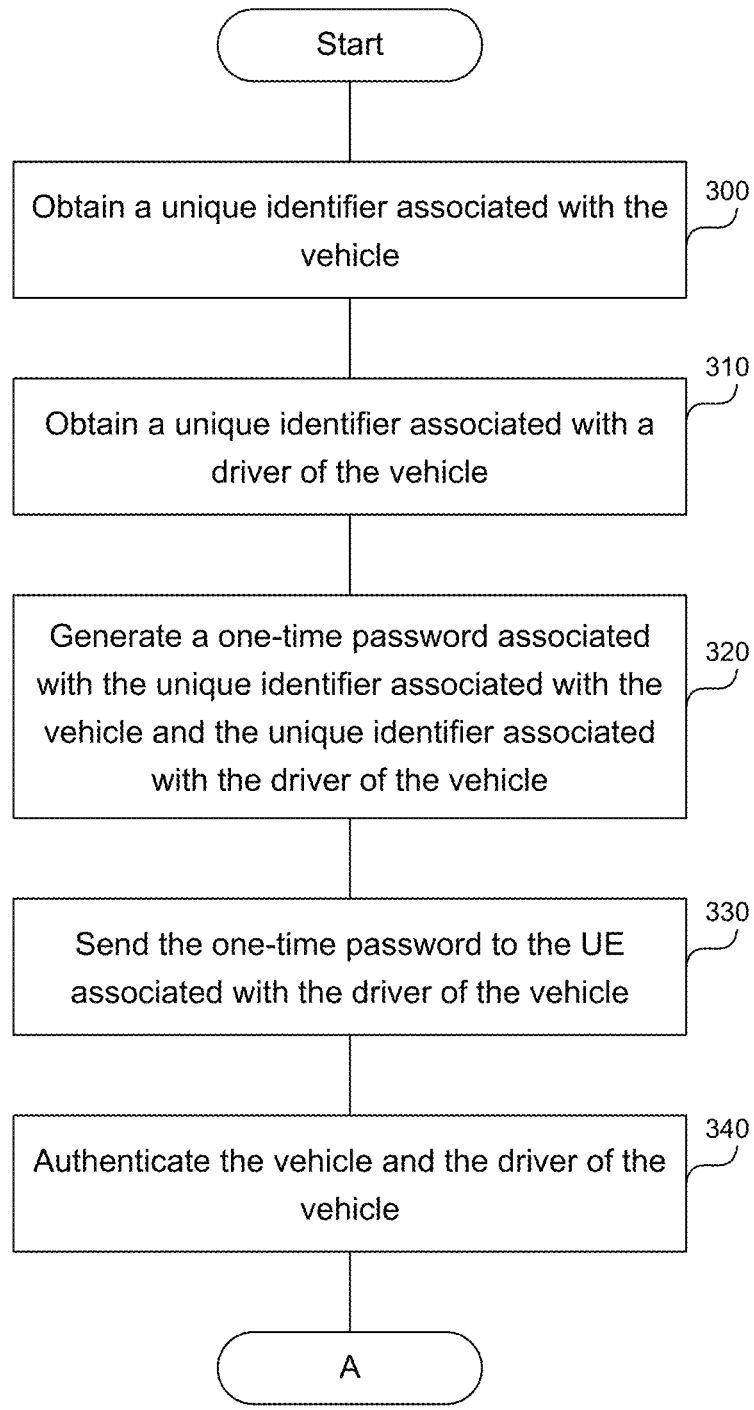
FIGS. 3A-3B are a flowchart of a method to reduce carbon emissions associated with a vehicle in a parking garage.
Figure 3B:
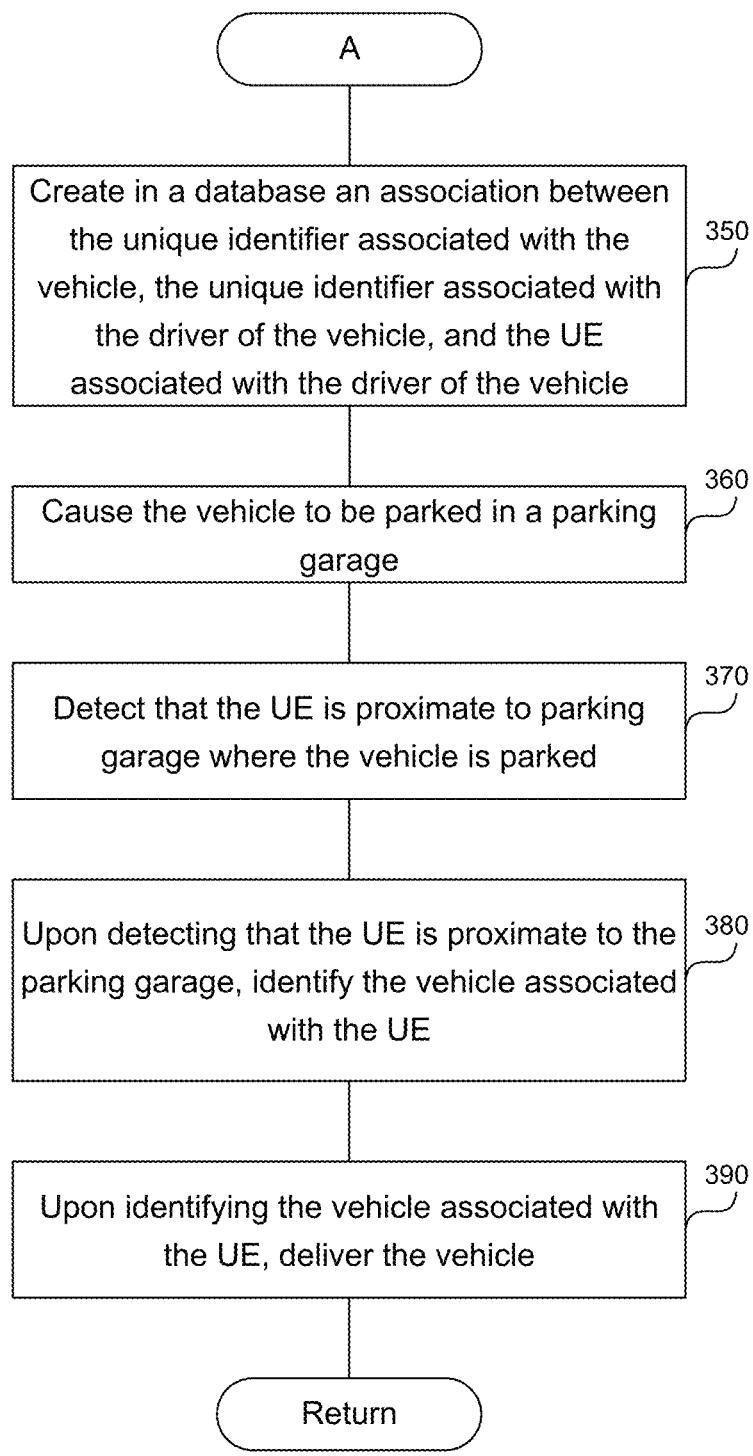

FIGS. 3A-3B are a flowchart of a method to reduce carbon emissions associated with a vehicle in a parking garage. In step 300, a hardware or software processor executing instructions described in this application can obtain a unique identifier associated with the vehicle by obtaining a license plate associated with the vehicle and a VIN. The processor can combine the license plate and the VIN to obtain the unique identifier associated with the vehicle.

In step 310, the processor can obtain a unique identifier associated with a driver of the vehicle, where the unique identifier is based on a unique identifier associated with a UE operating on a network 100 in FIG. 1 and a driver's license associated with the driver of the vehicle. The network 100 can be a 4G, 5G, or later generation wireless telecommunication network. The unique identifier associated with the UE can be a phone number associated with the UE, International Mobile Equipment Identity associated with the UE, Subscriber Concealed Identifier, Subscription Permanent Identifier, international mobile subscriber identity, etc. If the driver's license is stored in the digital wallet, the processor can obtain the driver's license from the digital wallet. Instead of, or in addition to, the driver's license, biometric measurements associated with the driver can be used, such as a scan of a unique body feature, including a fingerprint, retina, hand, and/or face. The processor can combine the driver's license and the mobile number to obtain the unique identifier associated with the driver of the vehicle by, for example, concatenating the driver's license and the mobile number.

In step 320, the processor can generate an OTP associated with the unique identifier associated with the vehicle and the unique identifier associated with the driver of the vehicle.

In step 330, the processor can send the OTP to the UE associated with the driver of the vehicle. In step 340, the processor can authenticate the vehicle and the driver of the vehicle by receiving the OTP from the mobile number associated with the UE.

In step 350, upon authenticating the driver, the processor can create in a database an association between the unique identifier associated with the vehicle, the unique identifier associated with the driver of the vehicle, and the UE associated with the driver of the vehicle. The processor can cause the vehicle to be parked in the parking garage. In the vehicle is a self-driving vehicle, the processor can determine an available spot in the parking garage and can signal the vehicle to drive to the available spot. Alternatively, upon finding the available spot in the parking garage, the processor can instruct an operator in the parking garage to park the vehicle in the available spot.

In step 360, the processor can cause the vehicle to be parked in a parking garage. In step 370, the processor can detect that the UE is proximate to the parking garage after a predetermined amount of time to avoid determining that the user wants to pick up the vehicle when the user is exiting the parking garage. The predetermined amount of time can be more than 10 minutes. After the passage of the predetermined amount of time and upon detecting that the UE is proximate to the parking garage, the processor can ask the driver for confirmation that the driver wants to pick up the car. If the driver is in the lounge, even without the confirmation from the driver, the processor can conclude that the driver wants to pick up the vehicle.

In step 380, upon detecting that the UE is proximate to the parking garage, the processor can identify the vehicle associated with the UE by retrieving from the database the unique identifier associated with the vehicle and corresponding to the UE.

In step 390, upon identifying the vehicle associated with the UE, the processor can deliver the vehicle. In one embodiment, if the vehicle is self-driving, the processor can send a signal to the vehicle to come to the vehicle drop-off/pickup area.

The processor can detect that the UE is within a first radius of the parking garage. Upon detecting that the UE is within the first radius of the parking garage, the processor can send a message to the UE asking for a confirmation to deliver the vehicle. The processor can receive the confirmation to deliver the vehicle. Upon receiving the confirmation, the processor can deliver the vehicle. If the driver is too busy to respond to the message, the processor can, without receiving the confirmation, detect that the UE is within a second radius of the parking garage, where the second radius is smaller than the first radius. For example, initially, the processor can detect the UE within the first radius of 40 m within the parking garage. If the UE does not send a confirmation message back to the processor, the processor can keep monitoring the UE and detect when the UE is within the second radius, such as 10 m of the parking garage, or when the UE is in the parking garage lounge. Upon detecting that the UE is within the second radius of the parking garage, the processor can deliver the vehicle without receiving the confirmation. If the vehicle is self-driving, the processor can send the signal to the vehicle to drive to the vehicle pickup area.

The processor can obtain a unique identifier associated with the parking spot where the vehicle is parked in the parking garage. The processor can create an association between the unique identifier associated with the parking spot, the unique identifier associated with the vehicle, and the UE associated with the driver of the vehicle. Upon detecting that the UE is proximate to the parking garage, the processor can generate a notification to deliver the vehicle parked in the parking spot to the driver of the vehicle.

The information obtained from the vehicle and the driver can be stored in the database and can be reused later at the same parking location where the different parking location has access to the database. In one embodiment, upon obtaining the unique identifier associated with the vehicle, the processor can determine whether the database contains the unique identifier associated with the vehicle. Upon determining that the database contains the unique identifier associated with the vehicle, the processor can retrieve from the database the UE associated with the unique identifier associated with the vehicle. The processor can send a request for a verification to the UE. The processor can monitor a passage of time since sending the request for the verification to the UE. After a predetermined amount of time, e.g., 1 minute, without receiving the verification from the UE, the processor can request that the driver of the vehicle enter a different mobile number. For example, the driver of the vehicle can have a different phone number, or the driver of the vehicle can change—for example, a child or spouse can drive the vehicle, and the different driver can have a different phone number. In that case, the processor can allow the new phone number to be associated with the same unique identifier of the vehicle.

In another embodiment, to reuse the information obtained from the vehicle and the driver, the processor can, upon obtaining the unique identifier associated with the vehicle, determine whether the database contains the unique identifier associated with the vehicle. Upon determining that the database includes the unique identifier associated with the vehicle, the processor can retrieve from the database the UE associated with the unique identifier associated with the vehicle. The processor can send a request for a verification to the UE. Upon receiving the verification from the UE, the processor can cause the vehicle to be parked in the parking garage.

To reduce greenhouse emissions, while the vehicle is parked in the parking garage, the processor can charge the vehicle via wireless charging using solar power provided by solar panels associated with the parking garage.

Computer System

Figure 4:
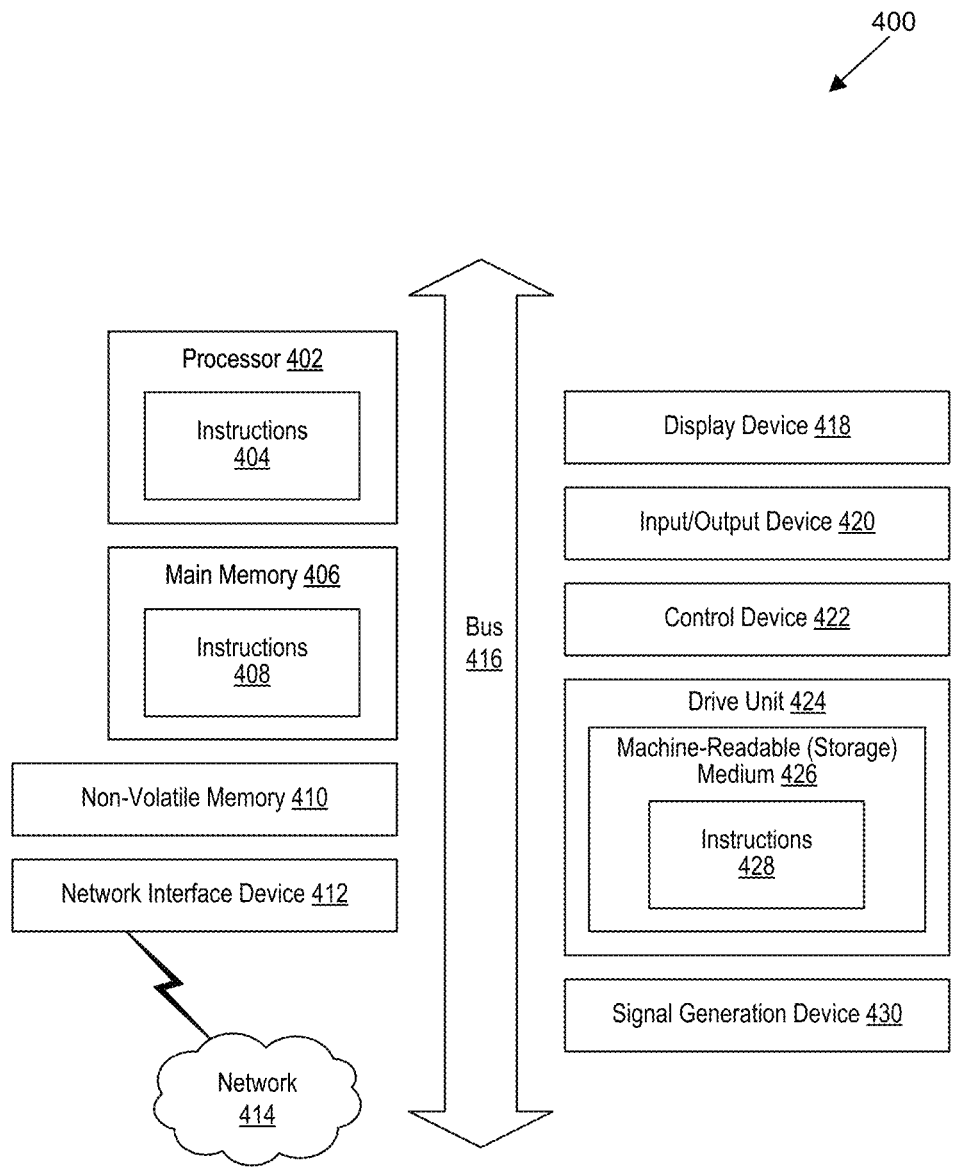
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, a video display device 418, an input/output device 420, a control device 422 (e.g., keyboard and pointing device), a drive unit 424 that includes a machine-readable (storage) medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the Figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementations, the computer system 400 can be an embedded computer system, a system-on-chip (SOC), a single-board computer system (SBC), or a distributed system such as a mesh of computer systems, or it can include one or more cloud components in one or more networks. Where appropriate, one or more computer systems 400 can perform operations in real time, in near real time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or they can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A non-transitory, computer-readable storage medium comprising instructions recorded thereon to reduce carbon emissions associated with a vehicle in a parking garage, wherein the instructions, when executed by at least one data processor of a system, cause the system to:
  obtain a unique identifier associated with the vehicle;
  obtain a unique identifier associated with a driver of the vehicle,
    wherein the unique identifier associated with the driver of the vehicle is based on a number associated with a mobile device operating on a wireless telecommunication network and a driver's license associated with the driver of the vehicle;
  generate a one-time password associated with the unique identifier associated with the vehicle and the unique identifier associated with the driver of the vehicle;
  send the one-time password to the mobile device associated with the driver of the vehicle;
  authenticate the vehicle and the driver of the vehicle by receiving the one-time password from the number associated with the mobile device;
  create in a database an association between the unique identifier associated with the vehicle, the unique identifier associated with the driver of the vehicle, and the mobile device associated with the driver of the vehicle;
  facilitate parking of the vehicle in the parking garage;
  detect that the mobile device is proximate to the parking garage;
  upon detecting that the mobile device is proximate to the parking garage, identify, using the database, the vehicle associated with the mobile device based on the unique identifier associated with the vehicle being associated with the mobile device in the database;
  upon identifying the vehicle associated with the mobile device, send signaling to the vehicle to cause the vehicle to be autonomously delivered to the driver of the vehicle;
  upon the vehicle reentering the parking garage associated with the database, enable an identification of the vehicle using a different mobile device number associated with the driver by:
    upon obtaining the unique identifier associated with the vehicle, determining whether the database contains the unique identifier associated with the vehicle;
    upon determining that the database includes the unique identifier associated with the vehicle, retrieving from the database the mobile device associated with the unique identifier associated with the vehicle;
    sending a request for a verification to the mobile device;
    monitoring a passage of time since sending the request for the verification to the mobile device;
    after a predetermined amount of time without receiving the verification from the mobile device, requesting that the driver of the vehicle enter a different number associated with the driver;
  obtain an available spot in the parking garage; and
  facilitate parking of the vehicle in the available spot.

2. The non-transitory, computer-readable storage medium of claim 1, comprising instructions to:

while the vehicle is parked in the parking garage, charge the vehicle via wireless charging using solar power provided by solar panels associated with the parking garage.

3. The non-transitory, computer-readable storage medium of claim 1, wherein the instructions to obtain the unique identifier associated with the vehicle comprise instructions to:
obtain a license plate associated with the vehicle and a vehicle identification number; and
combine the license plate and the vehicle identification number to obtain the unique identifier associated with the vehicle.

4. The non-transitory, computer-readable storage medium of claim 1, wherein the instructions to obtain the unique identifier associated with the driver of the vehicle comprise instructions to:
obtain the driver's license associated with the driver of the vehicle;
obtain a mobile number associated with the mobile device operating on the wireless telecommunication network; and
combine the driver's license and the mobile number to obtain the unique identifier associated with the driver of the vehicle.

5. The non-transitory, computer-readable storage medium of claim 1, comprising instructions to:
detect that the mobile device is within a first radius of the parking garage;
upon detecting that the mobile device is within the first radius of the parking garage, send a message to the mobile device asking for a confirmation to deliver the vehicle;
determine whether the confirmation to deliver the vehicle is received;
upon determining that the confirmation to deliver the vehicle is received deliver the vehicle;
upon determining that the confirmation to deliver the vehicle is not received, without receiving the confirmation, detect that the mobile device is within a second radius of the parking garage,
wherein the second radius is smaller than the first radius; and
upon detecting that the mobile device is within the second radius of the parking garage, deliver the vehicle without receiving the confirmation.

6. The non-transitory, computer-readable storage medium of claim 1, comprising instructions to:
obtain a unique identifier associated with a parking spot where the vehicle is parked in the parking garage;
create an association between the unique identifier associated with the parking spot, the unique identifier associated with the vehicle, and the mobile device associated with the driver of the vehicle; and
upon detecting that the mobile device is proximate to the parking garage, generate a notification to deliver the vehicle parked in the parking spot to the driver of the vehicle.

7. The non-transitory, computer-readable storage medium of claim 1, comprising instructions to:
upon obtaining the unique identifier associated with the vehicle, determine whether the database contains the unique identifier associated with the vehicle;
upon determining that the database includes the unique identifier associated with the vehicle, retrieve from the database the mobile device associated with the unique identifier associated with the vehicle;
send a request for a verification to the mobile device; and
upon receiving the verification from the mobile device, cause the vehicle to be parked in the parking garage.

8. A method, comprising:
obtaining a unique identifier associated with a vehicle;
obtaining a unique identifier associated with a user of the vehicle;
generating a one-time password associated with the unique identifier associated with the vehicle and the unique identifier associated with the user of the vehicle;
sending the one-time password to a UE associated with the user of the vehicle;
authenticating the vehicle and the user of the vehicle by receiving the one-time password from the unique identifier associated with the UE;
creating in a database an association between the unique identifier associated with the vehicle, the unique identifier associated with the user of the vehicle, and the UE associated with the user of the vehicle;
facilitate parking of the vehicle in a parking garage;
detecting that the UE is proximate to the parking garage where the vehicle is parked;
upon detecting that the UE is proximate to the parking garage, identifying, using the database, the vehicle associated with the UE based on the unique identifier associated with the vehicle being associated with the unique identifier associated with UE in the database;
upon identifying the vehicle associated with the UE, sending signaling to the vehicle to cause the vehicle to be autonomously delivered to the user of the vehicle;
upon the vehicle reentering the parking garage associated with the database, enabling an identification of the vehicle using a unique identifier associated with a different UE associated with the user by:
upon obtaining the unique identifier associated with the vehicle, determining whether the database contains the unique identifier associated with the vehicle;
upon determining that the database includes the unique identifier associated with the vehicle, retrieving from the database the UE associated with the unique identifier associated with the vehicle;
sending a request for a verification to the UE;
monitoring a passage of time since sending the request for the verification to the UE;
after a predetermined amount of time without receiving the verification from the UE, requesting that the user of the vehicle enter a different unique identifier associated with the user;
obtaining an available spot in the parking garage; and
facilitating parking of the vehicle in the available spot.

9. The method of claim 8, wherein obtaining the unique identifier associated with the vehicle comprises:
obtaining a license plate associated with the vehicle and a vehicle identification number; and
combining the license plate and the vehicle identification number to obtain the unique identifier associated with the vehicle.

10. The method of claim 8, wherein obtaining the unique identifier associated with the user of the vehicle comprises:
obtaining a user's license associated with the user of the vehicle;
obtaining the unique identifier associated with the UE operating on a wireless telecommunication network; and
combining the user's license and the unique identifier associated with the UE to obtain the unique identifier associated with the user of the vehicle.

11. The method of claim 8, comprising:
detecting that the UE is within a first radius of the parking garage;
upon detecting that the UE is within the first radius of the parking garage, sending a message to the UE asking for a confirmation to deliver the vehicle;
determining whether the confirmation to deliver the vehicle is received;
upon determining that the confirmation is received, delivering the vehicle;
upon determining that the confirmation is not received, without receiving the confirmation, detecting that the UE is within a second radius of the parking garage, wherein the second radius is smaller than the first radius; and
upon detecting that the UE is within the second radius of the parking garage, facilitate delivery of the vehicle without receiving the confirmation.

12. The method of claim 8, comprising:
obtaining a unique identifier associated with a parking spot where the vehicle is parked in the parking garage;
creating an association between the unique identifier associated with the parking spot, the unique identifier associated with the vehicle, and the UE associated with the user of the vehicle; and
upon detecting that the UE is proximate to the parking garage, generating a notification to deliver the vehicle parked in the parking spot to the user of the vehicle.

13. The method of claim 8, comprising:
upon obtaining the unique identifier associated with the vehicle, determining whether the database contains the unique identifier associated with the vehicle;
upon determining that the database includes the unique identifier associated with the vehicle, retrieving from the database the UE associated with the unique identifier associated with the vehicle;
sending a request for a verification to the UE; and
upon receiving the verification from the UE, facilitate parking of the vehicle in the parking garage.

14. A system comprising:
at least one hardware processor; and
at least one non-transitory memory storing instructions, which, when executed by the at least one hardware processor, cause the system to:
obtain a unique identifier associated with a vehicle;
obtain a unique identifier associated with a driver of the vehicle;
generate a one-time password associated with the unique identifier associated with the vehicle and the unique identifier associated with the driver of the vehicle;
send the one-time password to a UE associated with the driver of the vehicle;
authenticate the vehicle and the driver of the vehicle by receiving the one-time password from the UE;
create in a database an association between the unique identifier associated with the vehicle, the unique identifier associated with the driver of the vehicle, and the UE associated with the driver of the vehicle;
facilitate parking of the vehicle in a parking garage;
detect that the UE is proximate to the parking garage where the vehicle is parked;
upon detecting that the UE is proximate to the parking garage, identify, using the database, the vehicle associated with the UE based on the unique identifier of the vehicle being associated with the UE in the database;
upon identifying the vehicle associated with the UE, send signaling to the vehicle to cause the vehicle to be autonomously delivered to the driver of the vehicle;
upon the vehicle reentering the parking garage associated with the database, enabling an identification of the vehicle using a unique identifier associated with a different UE associated with the driver by:
upon obtaining the unique identifier associated with the vehicle, determining whether the database contains the unique identifier associated with the vehicle;
upon determining that the database includes the unique identifier associated with the vehicle, retrieving from the database the UE associated with the unique identifier associated with the vehicle;
sending a request for a verification to the UE;
monitoring a passage of time since sending the request for the verification to the UE;
after a predetermined amount of time without receiving the verification from the UE, requesting that the driver of the vehicle enter a different unique identifier associated with the driver;
obtain an available spot in the parking garage; and
facilitate parking of the vehicle in the available spot.

15. The system of claim 14, wherein the instructions to obtain the unique identifier associated with the vehicle comprise instructions to:
obtain a license plate associated with the vehicle and a vehicle identification number; and
combine the license plate and the vehicle identification number to obtain the unique identifier associated with the vehicle.

16. The system of claim 14, wherein the instructions to obtain the unique identifier associated with the driver of the vehicle comprise instructions to:
obtain a driver's license associated with the driver of the vehicle;
obtain the unique identifier associated with the UE operating on a wireless telecommunication network; and
combine the driver's license and the unique identifier associated with the UE to obtain the unique identifier associated with the driver of the vehicle.

17. The system of claim 14, comprising instructions to:
detect that the UE is within a first radius of the parking garage;
upon detecting that the UE is within the first radius of the parking garage, send a message to the UE asking for a confirmation to deliver the vehicle;
determine whether the confirmation to deliver the vehicle is received;
upon determining that the confirmation to deliver the vehicle is received, deliver the vehicle;
upon determining that the confirmation to deliver the vehicle is not received, without receiving the confirmation, detect that the UE is within a second radius of the parking garage,
wherein the second radius is smaller than the first radius; and
upon detecting that the UE is within the second radius of the parking garage, facilitate delivery of the vehicle without receiving the confirmation.

18. The system of claim 14, comprising instructions to:
obtain a unique identifier associated with a parking spot where the vehicle is parked in the parking garage;
create an association between the unique identifier associated with the parking spot, the unique identifier associated with the vehicle, and the UE associated with the driver of the vehicle; and upon detecting that the UE is proximate to the parking garage, generate a notification to deliver the vehicle parked in the parking spot to the driver of the vehicle.

19. The system of claim 14, comprising instructions to:
while the vehicle is parked in the parking garage, charge the vehicle via wireless charging using solar power provided by solar panels associated with the parking garage.

* * * * *